(12) United States Patent
Sankar

(10) Patent No.: US 10,122,203 B2
(45) Date of Patent: Nov. 6, 2018

(54) WIRELESS POWER SYSTEM

(71) Applicant: Ganapathy Sankar, Cupertino, CA (US)

(72) Inventor: Ganapathy Sankar, Cupertino, CA (US)

(73) Assignee: WIPQTUS INC., Cupertino, CA (US)

( * ) Notice: Subject to any disclaimer, the term of this patent is extended or adjusted under 35 U.S.C. 154(b) by 0 days.

(21) Appl. No.: 15/263,311

(22) Filed: Sep. 12, 2016

(65) Prior Publication Data

US 2017/0222466 A1    Aug. 3, 2017

Related U.S. Application Data

(63) Continuation-in-part of application No. 13/942,707, filed on Jul. 16, 2013, now Pat. No. 9,472,958.

(60) Provisional application No. 61/672,784, filed on Jul. 18, 2012.

(51) Int. Cl.
*H02J 7/02* (2016.01)
*H02J 7/04* (2006.01)
*H02J 50/80* (2016.01)
*H02J 50/12* (2016.01)

(52) U.S. Cl.
CPC ............. *H02J 7/025* (2013.01); *H02J 7/027* (2013.01); *H02J 7/045* (2013.01); *H02J 50/12* (2016.02); *H02J 50/80* (2016.02)

(58) Field of Classification Search
CPC ................................. H02J 50/12; H02J 50/80
See application file for complete search history.

(56) References Cited

U.S. PATENT DOCUMENTS

| 2007/0139000 A1* | 6/2007 | Kozuma | H02J 5/005 320/108 |
| 2008/0079392 A1* | 4/2008 | Baarman | H02J 7/025 320/108 |
| 2012/0091989 A1* | 4/2012 | Uramoto | H02J 5/005 324/76.11 |

* cited by examiner

*Primary Examiner* — Jeffrey Shin

(57) ABSTRACT

A higher power wireless power transmitter (HPWPT) including a first, second and third circuit and a transmit coil for wirelessly powering a lower power wireless power receiver (LPWPR) is provided. The first circuit is a switch network. The second circuit is variable impedance network and/or a tuning network. The third circuit is a control logic circuit configured to change the input voltage source or topology of the first circuit, to change the impedance and/or tuning characteristics of the second circuit, to select the transmit coil, vary frequency or duty cycle of the PWM signal or any combination thereof. The change in the input voltage or topology of first circuit or change in impedance or tuning characteristics of second circuit or change in the transmit coil used or the applied constraints on the frequency and duty cycle of the PWM signal constrain the maximum power transmitted by the HPWPT to LPWPR.

9 Claims, 8 Drawing Sheets

WIRELESS POWER SYSTEM

CROSS REFERENCE TO RELATED APPLICATIONS

This application is a continuation-in-part of application Ser. No. 13/942,707 filed in the United States Patent and Trademark Office on Jul. 16, 2013 which claims benefit from U.S. Provisional Application No. 61/672,784 filed on Jul. 18, 2012.

BACKGROUND

A low power wireless power receiver, for example, rated at 5 Watts (W), when receiving power from a higher power wireless power transmitter, for example, rated at 65 W needs to be protected against excessive power potentially being transmitted from the wireless power transmitter. Conventional wireless power receivers typically have a clamping mechanism to guard against harmful voltage and current conditions which occur when excessive power is received. These clamping mechanisms divert the excess power away from the main circuitry of the wireless power receiver thereby protecting the main circuitry of the wireless power receiver. However, the clamping mechanisms can drain away only up to a certain amount of excess power. This power limit of the clamping mechanism is set at the time of designing the clamping mechanism. When the excess power during the actual operation exceeds this power limit, the clamping mechanism will be damaged and will not be able to protect the main circuitry of the wireless power receiver any further. In that situation, the main circuitry of the wireless power receiver will also suffer permanent damage and the wireless power receiver will become non-functional.

As the lower rated power wireless power receivers could easily be exposed to unsafe power levels while being powered from a higher rated power wireless power transmitter, low power wireless power receivers are very susceptible to damages when used with such wireless power transmitters. Hence, there is a need for a wireless power system that constrains the higher rated power wireless power transmitter to transmit a known level of maximum power which does not exceed the safe limits of the wireless power receiver.

There are several wireless power receivers in the market today such as those built-in into smartphones of LG Nexus4, Nokia Lumia 920/820, HTC Droid, etc. or those in the accessory-sleeves for Apple IPhone, Samsung S3/S4, etc. These wireless charging receivers in smartphones and other portables will stop working if placed on top of higher power wireless power transmitters if such techniques as described herein were not implemented.

SUMMARY OF THE INVENTION

The wireless power system and method disclosed herein enables the delivery of a safe amount of power from a higher rated power wireless power transmitter to a lower rated power wireless power receiver. The wireless power system and method disclosed herein constrains the wireless power transmitter to transmit a known level of maximum power through multitude of techniques comprising, for example, an impedance network change, a dynamic topology change, a tuning circuit change, a transmit coil change, transmitter operation in discrete frequency regimes, transmitter operation in discrete duty cycle regimes, transmitter operation at different input voltages etc., and any combination thereof to ensure that a wireless power receiver will not be exposed to unsafe power levels.

A wireless power transmitter for safely charging a wireless power receiver is provided. The wireless power transmitter comprises a first circuit, a second circuit, and a third circuit. The first circuit, for example, a switch network is configured to receive an input voltage. In an embodiment, the first circuit is configured as an inverter in one of multiple inverter topologies, for example, a half bridge inverter topology, a full bridge inverter topology, a class D inverter topology, a class E inverter topology, etc. The second circuit is a variable matching circuit or a tuning circuit or a combination thereof. The second circuit can be used with any first circuit to limit the transmitted power. The second circuit comprises one or more of passive electronic components, active electronic components, and electronic switches for limiting the power transmitted to the wireless power receiver. The second circuit is connected between the first circuit and a transmitter coil. The transmitter coil is configured to wirelessly transmit power to the wireless power receiver.

The third circuit, for example, a control logic circuit is configured to provide a pulse width modulated (PWM) signal to the first circuit. The third circuit is configured to change the input voltage of the first circuit, to drive the first circuit to change a topology of the first circuit, to drive the second circuit to change impedance offered by the second circuit, to drive the second circuit to change its tuning characteristics, to select the transmit coil(s), vary frequency or duty cycle of the PWM signal, etc., or any combination thereof. The change in the input voltage or change in topology of the first circuit or change in impedance offered or tuning characteristics of the second circuit or change in the transmit coil used or the applied constraints on the frequency and duty cycle of the PWM signal limits the maximum power transmitted by the wireless power transmitter to the wireless power receiver.

In an embodiment, the third circuit of the wireless power transmitter determines the maximum power that is to be transmitted to the wireless power receiver based on receiving an implicit message or an explicit message from the wireless power receiver. On receiving and interpreting the message, the third circuit configurably adjusts the maximum power that could be transmitted to the wireless power receiver. The maximum power transmitted to the wireless power receiver is configurably adjusted either by selecting the appropriate input voltage for the first circuit, or by changing the topology of the first circuit, or by changing the impedance offered or by changing the tuning characteristics of the second circuit or by changing the transmit coil used, or by constraining the wireless power transmitter to operate in a frequency regime or a duty cycle regime or by a combination thereof.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and components disclosed herein.

DETAILED DESCRIPTION OF THE INVENTION

Figure 1:
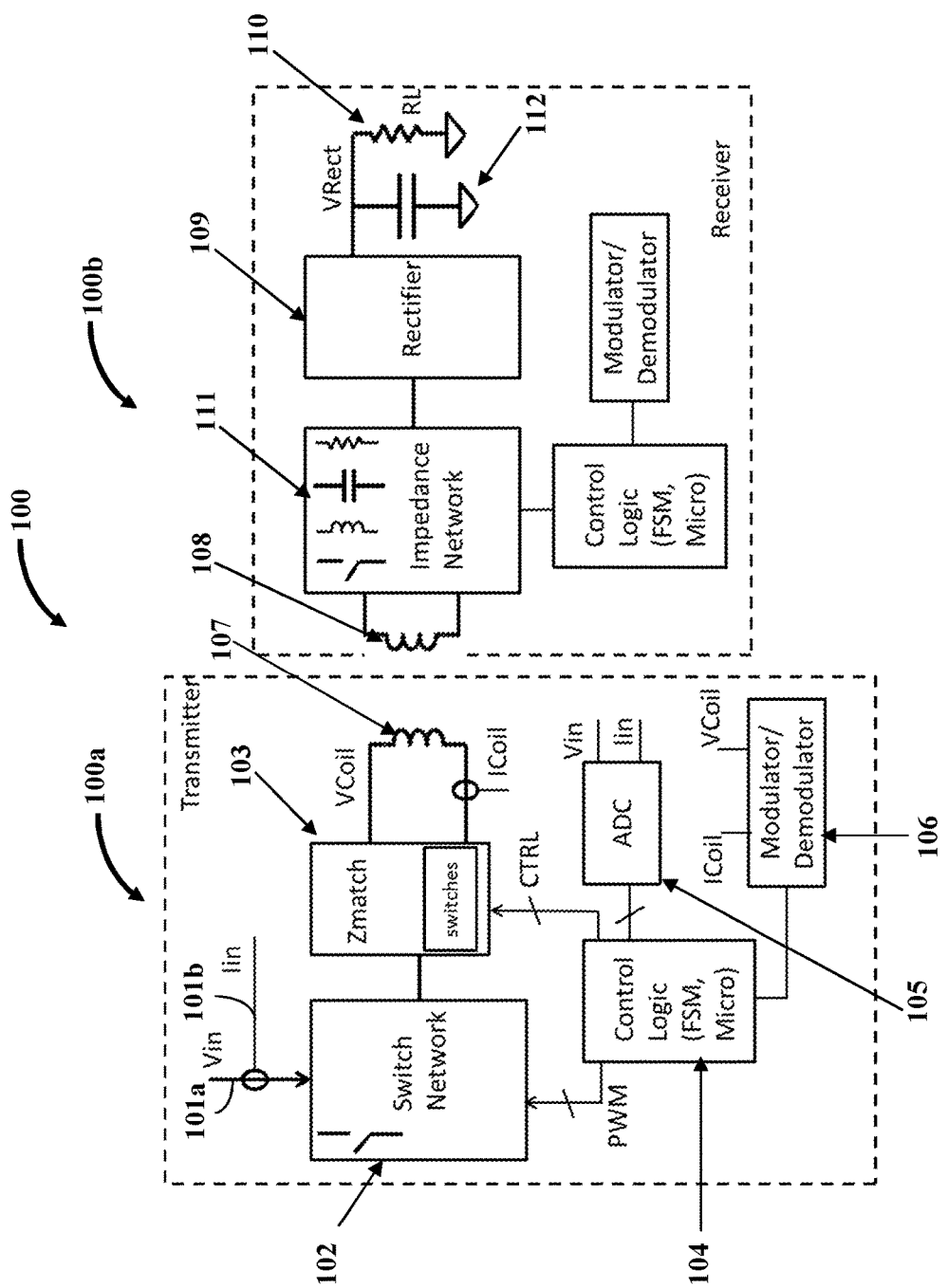
FIG. 1 exemplarily illustrates a schematic diagram of a wireless power system comprising a higher rated power wireless power transmitter that powers a lower rated power wireless power receiver without exceeding the rated power of the wireless power receiver.

FIG. 1 exemplarily illustrates a schematic diagram of a wireless power system 100 comprising a higher rated power wireless power transmitter 100a that provides power to a lower rated power wireless power receiver 100b, without exceeding the rated power of the wireless power receiver 100b. In an embodiment, the wireless power system 100 disclosed herein is configured as an inductive wireless power transfer system. The inductive wireless power transfer system comprises a wireless power transmitter 100a that generates an electromagnetic field to a coupling region for providing energy transfer to the wireless power receiver 100b. The wireless power transmitter 100a disclosed herein reconfigures itself to transmit a safe known amount of power sufficient for the wireless power receiver 100b to deliver its rated power to its load. By constraining its maximum power transmitted, the higher power wireless power transmitter 100a protects and safeguards the lower power wireless power receiver 100b. For example, when providing power to a wireless power receiver 100b rated at 5 W, the wireless power transmitter 100a rated at 65 Watts (W) reconfigures itself appropriately to provide power within the safe limits. The wireless power transmitter 100a does not deliver more than that required for the rated power of the wireless power receiver so as to ensure that the wireless power receiver 100b will not be damaged.

The wireless power transmitter 100a disclosed herein comprises a first circuit, a second circuit, and a third circuit. The first circuit is configured as a switch network 102 as exemplarily illustrated in FIG. 1 and FIG. 5. The switch network receives an input voltage and current from an external power source. In an embodiment, the first circuit is configured as an inverter in one of multiple inverter topologies, for example, a half bridge inverter topology, a full bridge inverter topology, a class D inverter topology, a class E inverter topology, etc. The switch network 102 comprises transistors that are configured to change a state, for example, into an on state or an off state, based on signals supplied to the switch network 102 from the third circuit.

Figure 2:
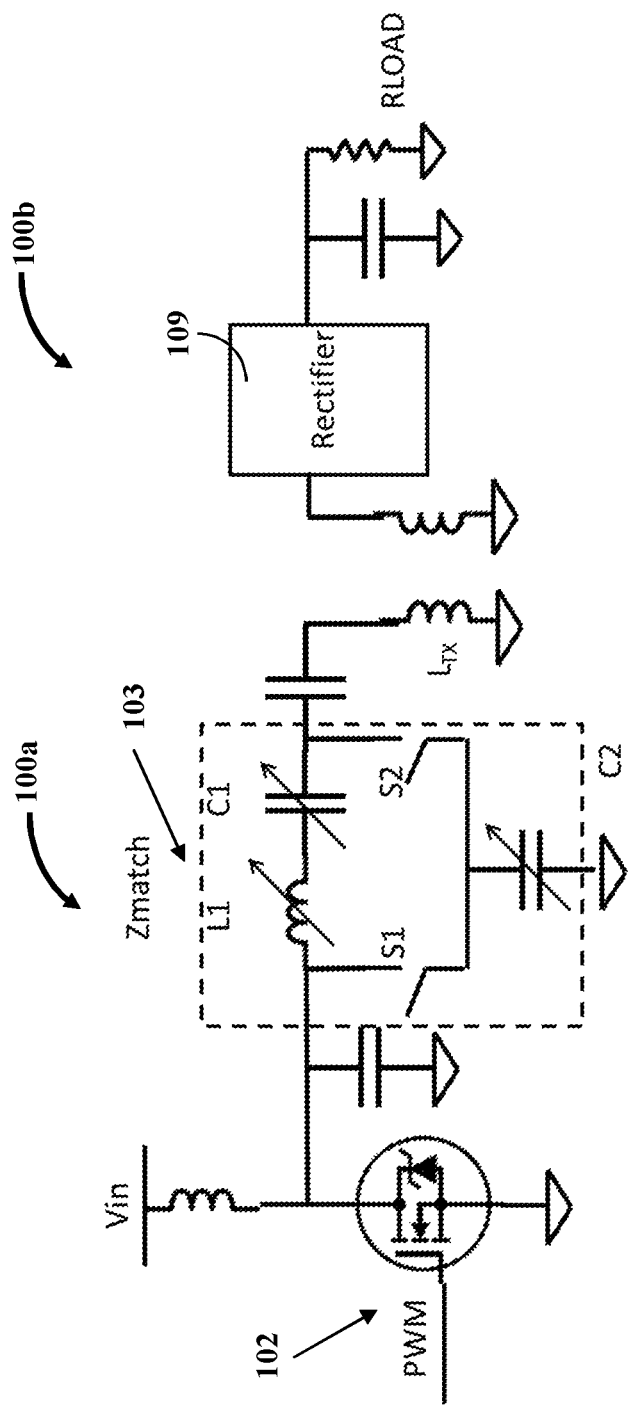
FIG. 2 exemplarily illustrates a first embodiment of the higher rated power wireless power transmitter, where the second circuit is configured as a variable matching circuit to enable safe charging of the wireless power receiver.
Figure 3:
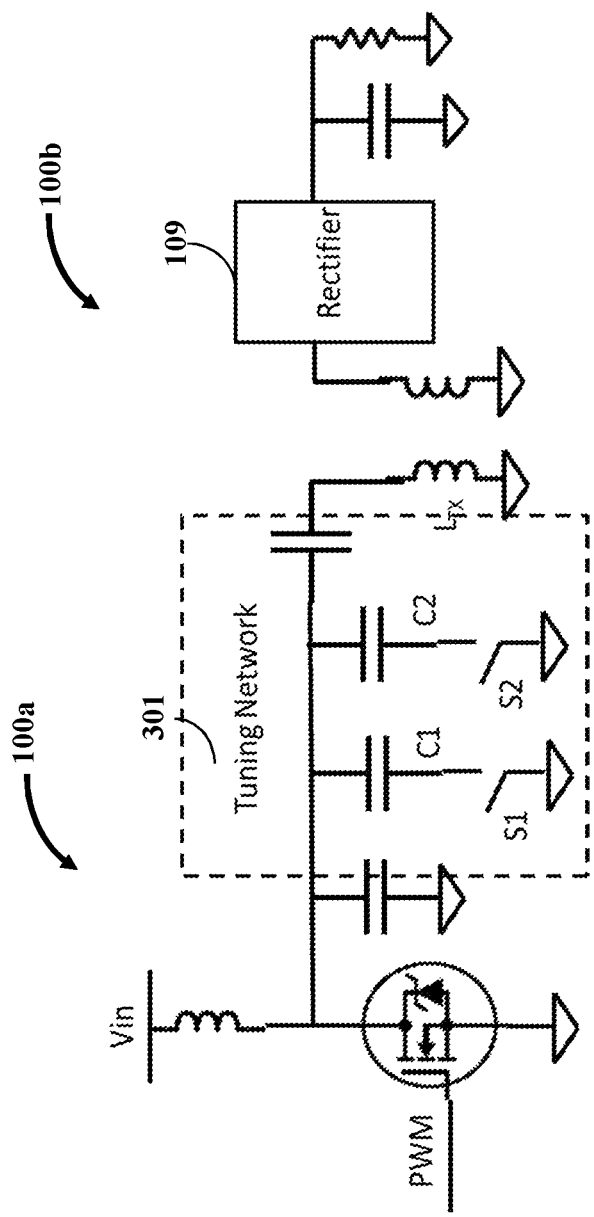
FIG. 3 exemplarily illustrates a second embodiment of the higher rated power wireless power transmitter, where the second circuit is configured as a tuning network to enable safe charging of the wireless power receiver.
Figure 4A:
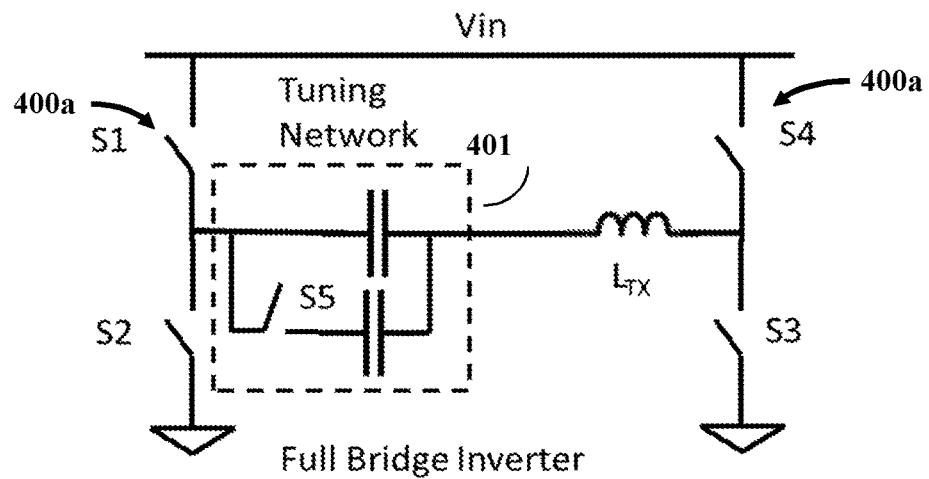
FIG. 4A exemplarily illustrates a third embodiment of the higher rated power wireless power transmitter, where the second circuit is configured as a tuning network and the first circuit operates as a full bridge inverter.
Figure 4B:
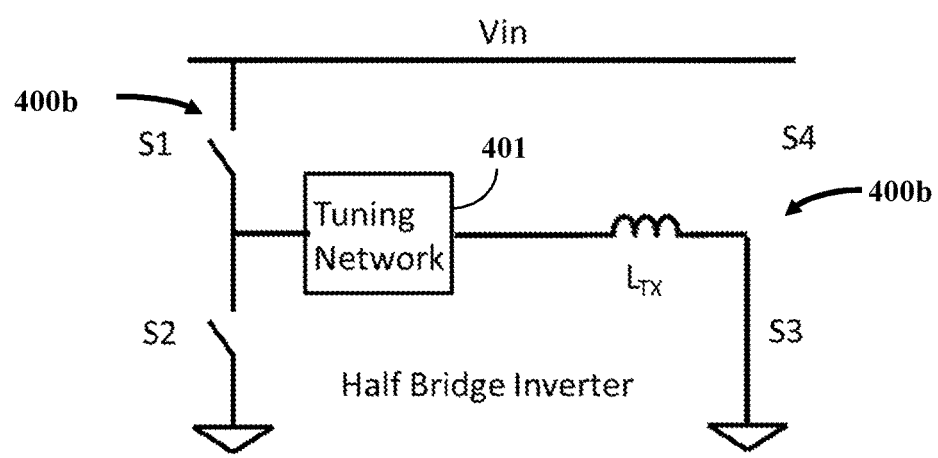
FIG. 4B exemplarily illustrates a fourth embodiment of the higher rated power wireless power transmitter, where the second circuit is configured as a tuning network and the first circuit operates as a half bridge inverter.
Figure 5:
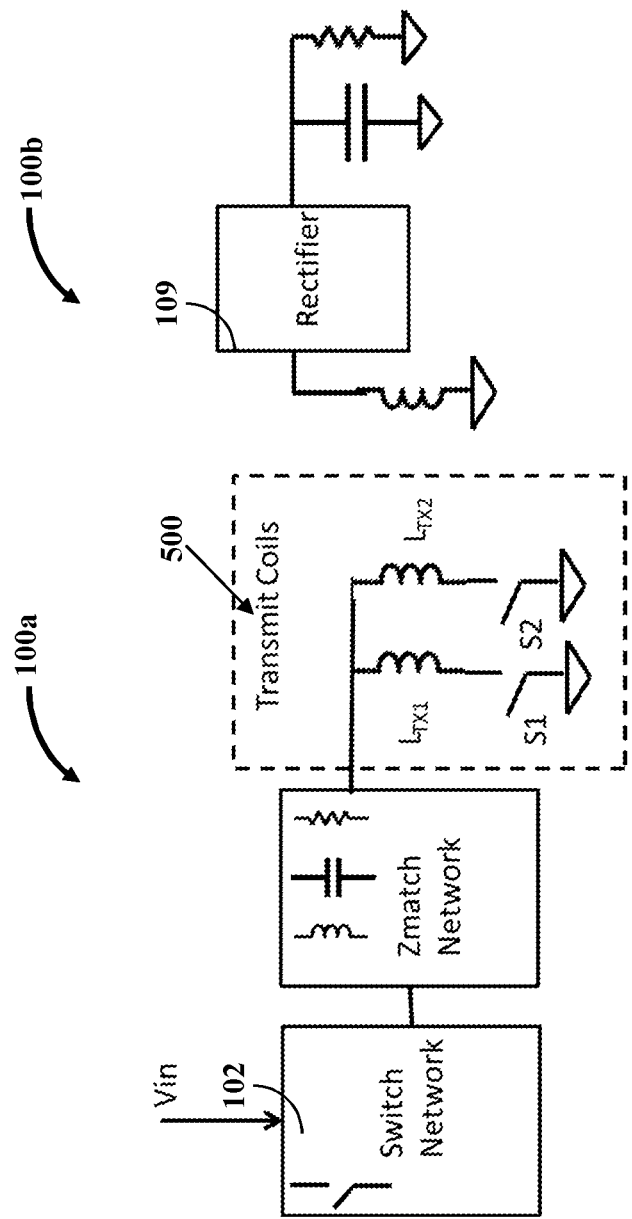
FIG. 5 exemplarily illustrates a sixth embodiment of the higher rated power wireless power transmitter, where the maximum power to the wireless power receiver is appropriately constrained by selection of the right wireless power transmit coil.

The second circuit is configured as a variable matching circuit 103, exemplarily illustrated as a "Zmatch" block in FIGS. 1-2 and FIG. 5, or as a Tuning network 301 or 401 as exemplarily illustrated in FIG. 3 and FIGS. 4A-4B. The second circuit 103 comprises one or more of passive electronic components, for example, a resistor, a capacitor, an inductor, a magnetic device, a transducer, etc.; active electronic components, for example, a diode, a transistor such as a metal oxide semiconductor field effect transistor (MOSFET), a bipolar transistor, etc., operational amplifiers, an optoelectronic device, directional coupler, etc., and electronic switches. These electronic components in combination are utilized for limiting the power transmitted to the wireless power receiver 100b. The second circuit 103 is connected between the switch network 102 and a transmitter coil 107. The transmitter coil 107 is configured to wirelessly transmit power to the wireless power receiver 100b. The transmitter coil 107 is used for inducing an electromagnetic field to a coupling region for providing energy transfer to the wireless power receiver 100b. The wireless power transmitter 100a transmits power to the wireless power receiver 100b by radiating a required electromagnetic field using the transmitter coil 107. The wireless power receiver 100b comprises a receiver coil 108 that picks up the electromagnetic field with a certain coupling coefficient that exists between the transmitter coil 107 and the receiver coil 108.

The third circuit is configured as a control logic circuit 104, for example, a state machine, a microcontroller, etc., of the wireless power transmitter 100a. Analog input signals are converted to digital signals by an analog to digital converter (ADC) 105 operably coupled to the control logic circuit 104 of the wireless power transmitter 100a. The output signal of the ADC 105 is fed to the control logic circuit 104. The modulator/demodulator block 106 senses, filters and decodes messages from the wireless power receiver 100b. The output of the modulator/demodulator block 106 is also fed to the control logic circuit 104. The control logic circuit 104 takes inputs from the ADC block 105 and from the modulator/demodulator block 106 and appropriately configures the first circuit, second circuit, transmit coil and input voltage source selection to ensure that a safe amount of power is transmitted to the wireless power receiver. The control logic circuit also drives the PWM signal to the switch network 102 adhering to the appropriate frequency range and duty cycle range. The control logic circuit 104 enables or disables electronic components in the variable matching circuit 103 using general purpose input/outputs (GPIOs) and switches.

In an embodiment as exemplarily illustrated in FIG. 1, the control logic circuit 104 is configured to change the input voltage source 101a of the switch network 102. The wireless power transmitter 100a can receive multiple input voltages sources 101a, for example, at 5 Volts (V), 12V, 19V, etc., and can switch to different input voltage sources 101a to transmit a different amount of power to the wireless power receiver 100b. The change in the input voltage source 101a limits the maximum power transmitted by the wireless power transmitter 100a to the wireless power receiver 100b.

Figure 4C:
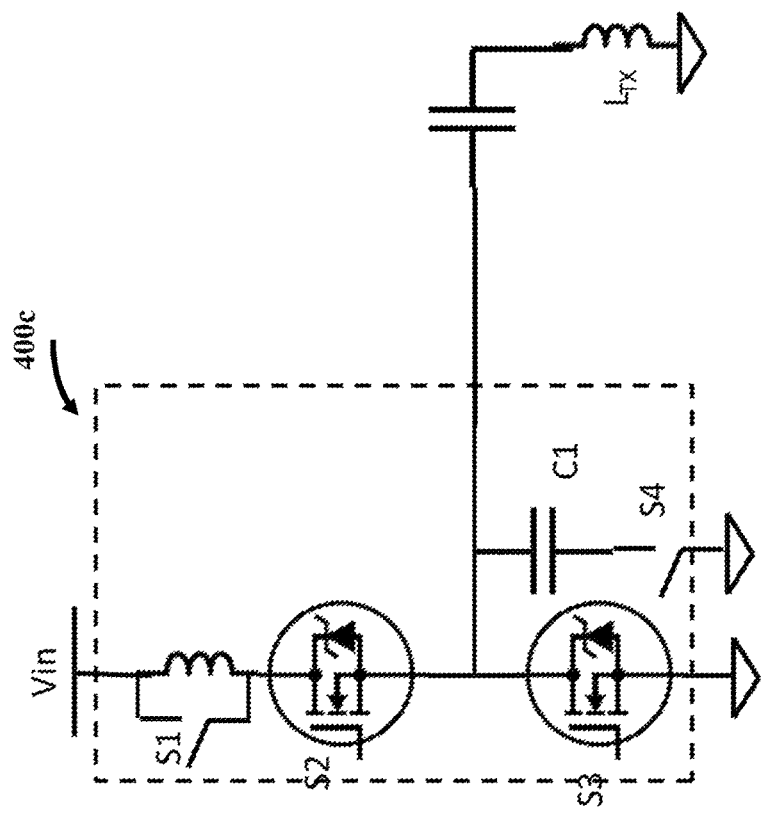
FIG. 4C exemplarily illustrates a fifth embodiment of the higher rated power wireless power transmitter, where the first circuit's inverter topology can be configured as a ClassD or ClassE depending on the rated power of the wireless power receiver.

In an embodiment as exemplarily illustrated in FIGS. 4A-4C, the control logic circuit 104 is configured to change the topology of the switch network 102. As exemplarily illustrated in FIG. 4A, the control logic circuit configures the first circuit to operate as a Class D full bridge inverter. As exemplarily illustrated in FIG. 4B, the control logic circuit configures the first circuit to operate as a Class D half bridge inverter. As exemplarily illustrated in FIG. 4C, the control logic circuit configures the first circuit to operate either as a Class D half bridge inverter or Class E inverter. The change in switch network topology limits the maximum power transmitted by the wireless power transmitter 100a to the wireless power receiver 100b.

The control logic circuit 104 of the wireless power transmitter 100a drives the variable matching circuit 103 to change impedance offered by the variable matching circuit 103. The control logic circuit 104 utilizes GPIOs and switches to enable or disable the electronic components in the variable matching circuit 103 and change the impedance of the variable matching circuit 103 accordingly. The change in the impedance of the variable matching circuit 103 ensures that for a given input voltage 101a, the maximum power transferred is guaranteed to be within a certain limit. The control signal (CTRL) from the control logic circuit 104 limits the amount of power that the wireless power transmitter 100a can deliver to the wireless power receiver 100b. For example, a 65 W wireless power transmitter 100a is programmed to deliver no more than 5 W plus expected losses in the wireless power charging system 100 to the wireless power receiver 100b. Specifically, if the expected efficiency of the wireless power system 100 is 70% at 5 W transfer, then the wireless power transmitter 100a prevents its input power from exceeding 5/0.7=7.14 W. In this case, the wireless power transmitter 100a configures the variable matching circuit 103 accordingly such that in the range of frequency of operation, maximum input power does not exceed 7.14 W.

As a secondary safety precaution, the wireless power transmitter 100a disclosed herein monitors input power by monitoring input voltage (Vin) 101a and input current (Iin) 101b to ensure that the input power does not exceed beyond the expected power level. This secondary safety precaution accounts for fault conditions such as a short circuit, an open circuit, etc., on the wireless power receiver 100b side.

In an embodiment, the control logic circuit 104 of the wireless power transmitter 100a determines the maximum power that is to be transmitted to the wireless power receiver based on receiving an implicit message or an explicit message from the wireless power receiver. On receiving and interpreting the message, the control circuit adjusts the maximum power that could be transmitted to the wireless power receiver. The maximum power transmitted to the wireless power receiver is adjusted either by selecting the appropriate input voltage for the first circuit, or by changing the topology of the first circuit, or by changing the impedance offered or by changing the tuning characteristics of the second circuit or by changing the transmit coil used, or by constraining the wireless power transmitter to operate in a frequency regime or a duty cycle regime or by a combination thereof.

FIG. 2 exemplarily illustrates an embodiment of the variable matching circuit configured in the second circuit 103 of the wireless power transmitter 100a. There are various types of impedance matching circuits such as the L-match networks and Pi-match networks. In this embodiment, an L-match network is used for adjusting the impedance so as to limit the maximum power and enable safe charging of the wireless power receiver 100b. The switch network 102 may be configured as an inverter in one of multiple inverter topologies and in the embodiment as exemplarily illustrated in FIG. 2, the switch network is configured to operate in a class E inverter configuration. Inductor L1, capacitor C1 and capacitor C2 of the variable matching circuit 103, exemplarily illustrated as a "Zmatch" block in FIG. 2, are configured by the control logic circuit 104 to limit the maximum power transmitted to the wireless power receiver 100b. Via switches S1 and S2, the capacitor C2 is added to the impedance matching network before L1 or after C1. Switch S1 and S2 are left open if capacitor C2 is not required. The change in the impedance offered by the variable matching circuit 103 limits the power transmitted by the wireless power transmitter 100a to the wireless power receiver 100b.

FIG. 3 exemplarily illustrates an embodiment of the tuning circuit configured in the second circuit 103 of the wireless power transmitter 100a. The switch network 102 may be configured as an inverter in one of multiple inverter topologies and in this embodiment as exemplarily illustrated in FIG. 3, the switch network is configured to operate in a class E inverter configuration. In this embodiment, the resonance operation of the circuit with respect to the operating frequency of the inverter is adjusted via switches S1 and S2 to limit the maximum power and enable safe charging of the wireless power receiver 100b. For example, in normal operation, the S1 switch and the S2 switch are open and the wireless power transmitter 100a is capable of delivering 65 W, as exemplarily illustrated in FIG. 6A. In another example, if the S1 switch is closed, then the maximum amount of power can be limited, for example, to 35 W. If the S1 switch and the S2 switch are closed, then the maximum amount of power can be limited, for example, to 5 W. The change in the resonance characteristics of the tuning circuit 103 limits the power transmitted by the wireless power transmitter 100a to the wireless power receiver 100b.

The switch network 102 can be operated in a frequency regime. The frequency regime refers to a definite range of frequencies of operation of the switch network. In this embodiment, the control logic circuit 104 is configured to restrict the frequency of the PWM signal to the chosen frequency regime. The maximum power delivered by the wireless power transmitter 100a to the wireless power receiver 100b is limited to various levels by operating the switch network in different frequency regimes, as disclosed in the detailed description of FIG. 6B.

Furthermore, the switch network 102 can be operated in a duty cycle regime. The duty cycle regime refers to a definite range of duty-cycles of operation of the switch network. In this embodiment, the control logic circuit 104 is configured to restrict the duty cycle of the PWM signal to the chosen duty cycle regime. The maximum power delivered by the wireless power transmitter 100a to the wireless power receiver 100b can be limited to various levels by operating the switch network in different duty cycle regimes. For a given PWM signal frequency, the PWM signal duty cycle range can be assigned for different power levels, as disclosed in the detailed description of FIG. 6C.

The switch network 400a in FIG. 4A exemplarily illustrates an embodiment of the switch network 102 of the wireless power transmitter 100a shown in FIG. 1, where the first circuit is configured as a Class D full bridge inverter 400a. The switch network 400b in FIG. 4B exemplarily illustrates another embodiment of the switch network 102 of the wireless power transmitter 100a shown in FIG. 1, where the first circuit is configured as a Class D half bridge inverter 400b. For illustration purposes, in FIGS. 4A-4B, the respective switch networks are connected to a tuning circuit and transmit coil $L_{TX}$. FIGS. 4A-4B shows the change in switch circuit topology from a half bridge inverter 400b to a full bridge inverter 400a, and vice versa. In this embodiment, the control logic circuit 104 is configured to drive the switch network 102 to change the topology of the switch network 102. The change in the topology of the switch network 102 limits the maximum power transmitted by the wireless power transmitter 100a to the wireless power receiver 100b. That is, switching the switch circuit topology from the half bridge inverter 400b to the full bridge inverter 400a and vice versa helps limit the maximum power transmitted from the wireless power transmitter 100a to the wireless power receiver 100b shown in FIG. 1. For a given fixed input to the wireless power transmitter 100a, a half bridge inverter 400b delivers lesser power than the full bridge inverter 400a. As exemplarily illustrated in FIG. 4A, a full bridge inverter 400a comprising switches S1, S2, S3, and S4 can be transformed to a half bridge inverter 400b, as exemplarily illustrated in FIG. 4B, by closing the switch S3 and opening or disconnecting switch S4. In an example, a full bridge inverter 400a topology can be used to deliver a maximum of 45 W while its reconfigured half bridge inverter 400b topology may deliver only a maximum of 10 W. This dynamic change in topology is employed to limit the maximum amount of power transmitted wirelessly to the wireless power receiver.

The switch network 400c in FIG. 4C exemplarily illustrates another embodiment of the switch network 102 of the wireless power transmitter 100a shown in FIG. 1. For illustration purposes, in FIG. 4C, the switch network 400c is connected to a series resonance tuning capacitor and transmit coil $L_{TX}$. The switch network 400c in FIG. 4C can be configured as a Class D half bridge inverter or Class E inverter. In this embodiment, the control logic circuit 104 in FIG. 1 drives the switch network to change its topology between Class D half bridge inverter and a Class E inverter. The change in the topology of the switch network 102 limits the power transmitted by the wireless power transmitter 100a to the wireless power receiver 100b. That is, switching the switch circuit topology from the Class D half bridge inverter 400c to the Class E inverter 400a and vice versa helps limit the maximum power transmitted from the wireless power transmitter 100a to the wireless power receiver 100b shown in FIG. 1. For a given fixed input to the wireless power transmitter 100a, a Class D half bridge inverter 400b delivers lesser power than a Class E inverter 400a. As exemplarily illustrated in FIG. 4C, the switch network 400c is transformed into a Class D half bridge inverter by closing switch S1 and opening switch S4. The PWM signal drives switches S2 and S3 to deliver power wirelessly via the transmit coil $L_{TX}$ to the wireless power receiver 100b. The switch network 400c is transformed into a Class E inverter by closing switch S2 and S4 and opening switch S1. The PWM signal drives switches S3 to deliver power wirelessly via the transmit coil $L_{TX}$ to the wireless power receiver 100b. In an example, the switch network 400c in a Class D half bridge inverter topology may deliver a maximum of 10 W while in a Class E inverter topology may deliver a maximum of 20 W. This dynamic change in topology is employed to limit the maximum amount of power transmitted wirelessly to the wireless power receiver.

FIG. 5 exemplarily illustrates another embodiment of the wireless power transmitter 100a, where the control logic circuit 104 in FIG. 1 configures the transmit coil network 500 to enable safe charging of the wireless power receiver 100b. The transmit coil network 500 in FIG. 5 is implemented using multiple inductors and switches. For example, the wireless power transmitter 100a uses inductor $L_{TX1}$ to transmit a maximum of 65 W power to the wireless power receiver 100b by keeping switch S1 closed and switch S2 open. The wireless power transmitter 100a uses inductor $L_{TX2}$ to transmit a maximum of 5 W power to the wireless power receiver 100b by keeping switch S1 open and switch S2 closed. The wireless power transmitter 100a uses multiple coils and switches for transmitting various levels of maximum power to the wireless power receiver 100b.

Figure 6A:
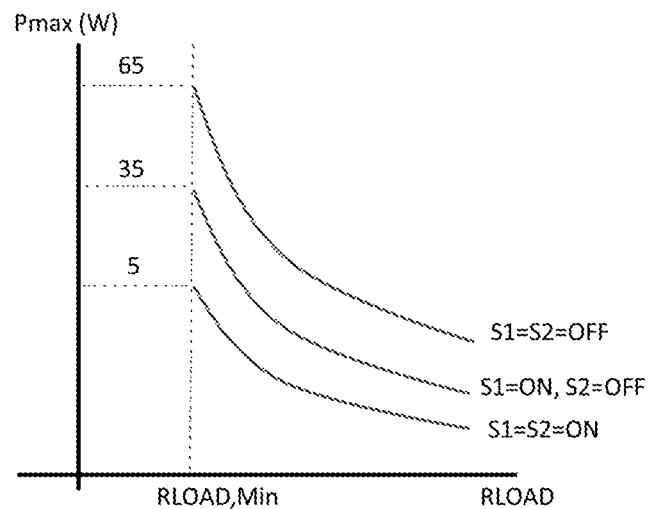
FIGS. 6A-6C exemplarily illustrate graphical representations showing the power transmitted by the wireless power transmitter to the wireless power receiver as a function of a load applied to the wireless power transmitter.
Figure 6B:
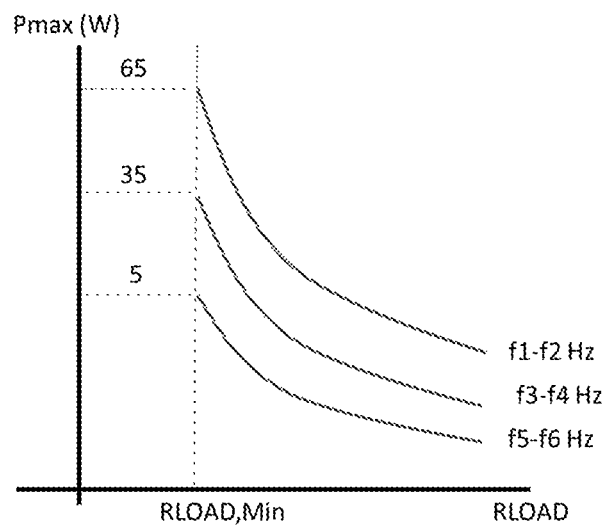
Figure 6C:
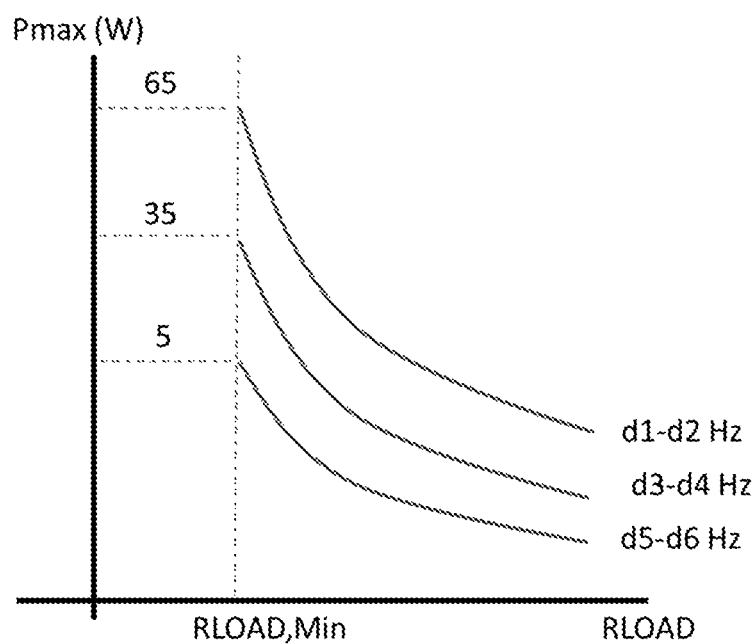

FIG. 6A-6C exemplarily illustrate graphical representations showing the power transmitted by the wireless power transmitter 100a to the wireless power receiver 100b exemplarily illustrated in FIG. 1, as a function of a load applied to the wireless power transmitter 100a. FIG. 6A exemplarily illustrates a graphical representation showing the power transmitted by the wireless power transmitter 100a to the wireless power receiver 100b as a function of a load and tuning characteristics of the tuning circuitry illustrated in FIG. 3. If switch S1 and switch S2 are open in FIG. 3, then the maximum amount of power delivered by the wireless power transmitter 100a to the wireless power receiver 100b is 65 W. If switch S1 is closed and switch S2 is open, then the maximum amount of power delivered by the wireless power transmitter 100a to the wireless power receiver 100b is limited to 35 W. If S1 switch and the S2 switch are closed, then the maximum amount of power delivered by the wireless power transmitter 100a to the wireless power receiver 100b is limited to 5 W.

FIG. 6B exemplarily illustrates a graphical representation showing the power transmitted by the wireless power transmitter 100a to the wireless power receiver 100b as a function of a load in a frequency regime. For example, the wireless power transmitter 100a uses a frequency range of f1-f2 Hertz (Hz) to deliver a maximum power of 65 W to the wireless power receiver 100b. Similarly, the wireless power transmitter 100a uses a frequency range of f3-f4 Hz to deliver a maximum power of 35 W to the wireless power receiver 100b. Furthermore, the wireless power transmitter 100a uses a frequency range of f5-f6 Hz to deliver a maximum power of 5 W to the wireless power receiver 100b. In an embodiment, the maximum power transmitted to the wireless power receiver 100b is configurably adjusted by constraining the wireless power transmitter 100a to operate in a particular frequency regime by varying the frequency of the pulse width modulated signal. For example, the wireless power transmitter 100a is programmed to operate, for example, at 65 W, 35 W, 5 W, etc., by constraining the wireless power transmitter 100a to operate in frequency regimes f2-f2 Hz, f3-f4 Hz, f5-f6 Hz, etc., respectively.

FIG. 6C exemplarily illustrates a graphical representation showing the power transmitted by the wireless power transmitter 100a to the wireless power receiver 100b as a function of a load in a duty cycle regime. For example, the wireless power transmitter 100a uses a d1-d2 duty cycle range to transmit a maximum power of 65 W to the wireless power receiver 100b, a d3-d4 duty cycle range to transmit a maximum power of up to 35 W to the wireless power receiver 100b, and a d5-d6 duty cycle range to transmit a maximum power of up to 5 W to the wireless power receiver 100b. Duty cycle regimes can be broken into as many ranges as necessary. In an embodiment, the maximum power transmitted to the wireless power receiver 100b is configurably adjusted by constraining the wireless power transmitter 100a to operate in a particular duty cycle regime by varying the duty cycle of the pulse width modulated signal. For example, the wireless power transmitter 100a is programmed to operate at a maximum power, for example, of 65 W, 35 W, 5 W, etc., by constraining the wireless power transmitter 100a to operate in duty cycle regimes d1-d2, d3-d4, d5-d6, etc., respectively.

Although the detailed description refers to the switch network 102 being operated in a class E inverter configuration as exemplarily illustrated in FIG. 2, FIG. 3 and FIG. 4C and a class D inverter configuration as exemplarily illustrated in FIG. 4A-4C, the scope of the wireless power transmitter 100a disclosed herein is not limited to the switch network 102 being operated in a class E inverter configuration or the class D inverter configuration and is extended to be operated in other functionally equivalent inverter topologies. The maximum power transmitted to the wireless power receiver 100b exemplarily illustrated in FIGS. 1-3 and FIG. 5 is thereby configurably adjusted either by selecting the appropriate input voltage 101a for the first circuit 102, or by changing the topology of the first circuit 102, or by changing the impedance offered or by changing the tuning characteristics of the second circuit 103 or by changing the transmit coil 107 used, or by constraining the wireless power transmitter to operate in a frequency range or a duty cycle range or by any combination thereof.

The wireless power system and method disclosed herein enables the delivery of a safe amount of power from a higher rated power wireless power transmitter to a lower rated power wireless power receiver. For example, when a smartphone with an integrated wireless power receiver whose rated power is 5 W is placed on a wireless power transmitter that includes techniques described herein, the wireless power transmitter would constrain itself, for example, configure its switch network as a Class D half bridge inverter, configure its tuning network and operate in a frequency range of f5-f6 Hz and duty cycle range of d5-d6% so as to limit the maximum power transmitted. If a tablet with an after-market accessorized wireless power receiver whose rated power is 15 W is placed on such a wireless power transmitter, the wireless power transmitter may switch into a Class E inverter topology, operate at fixed frequency and duty cycle and adjust its Zmatch network so as to not exceed the power limit. If a notebook with a wireless power receiver whose rated power is 65 W is placed on such a wireless power transmitter, the wireless power transmitter may switch into a Class D full bridge inverter topology, increase the input supply voltage, use a different transmit coil and operate in a frequency range of f1-f2 Hz and duty cycle range of d1-d2% so as to increase and yet limit the maximum power transmitted. If a blue-tooth headset with a wireless power receiver whose rated power is 300 mW is placed on such a wireless power transmitter, the wireless power transmitter may configure its switch network as a Class D half bridge inverter, operate at a fixed frequency which is the resonance frequency of the receiver, adjust its tuning network and constrain its duty cycle to safe range so as to not exceed the maximum power that the wireless power transmitter can safely receive.

In this wireless power system 100, the mode of wireless power transfer from the wireless power transmitter 100a to one or more wireless power receivers 100b may be inductive, capacitive or electromagnetic. The wireless power receivers 100b may be placed on top or in the vicinity of the wireless power transmitter 100a. When radio frequency (RF) spectrum such as that used for WiFi communication is utilized to transfer power wirelessly from the transmitter to the receiver, the wireless power receivers 100b may be atop, in the vicinity or significantly separated from the wireless power transmitter 100a. The wireless power system and method disclosed herein constrains the wireless power transmitter 100a to transmit a known level of maximum power through multitude of techniques to ensure that a wireless power receiver 100b will not be exposed to unsafe power levels.

During stable power transfer from the wireless power transmitter 100a to one or more wireless power receivers 100b, one or more wireless power receivers 100b may be placed within or removed from the charging zone of the wireless power transmitter 100a. As disclosed herein, charging zone is the area surrounding the wireless power transmitter 100a within which wireless power receiver 100b if placed, can wirelessly receive power from this wireless power transmitter 100a. Removal of one or more wireless power receivers 100b from the charging zone of the wireless power transmitter 100a would instantaneously expose the wireless power receivers 100b that are still in the charging zone to unsafe power levels. Consider an example, where wireless power transmitter 100a is providing 1 W of power to a first wireless power receiver 100b and 10 W of power to a second wireless power receiver 100b. During stable power transfer, when the second wireless power receiver 100b is removed from the charging zone, it takes the wireless power transmitter 100a a finite amount of time to recognize this removal and adjust its power output. During this short time, the first wireless power receiver 100b that is still in the charging zone is exposed to a higher level of wireless power which may be unsafe and that could potentially damage the first wireless power receiver 100b. In the wireless power system disclosed herein, the wireless power receiver 100b includes mechanisms to detect the surge in input wireless power. It then takes action to protect its circuitry. In the first embodiment, when the surge in wireless power exceeds the safe threshold, the wireless power receiver 100b adjusts its impedance network 111 in FIG. 1 to reduce the amount of power delivered to the rectifier 109. The wireless power receiver's 100b impedance network 111 comprises one or more of passive electronic components, for example, a resistor, a capacitor, an inductor, a magnetic device, a transducer, etc.; active electronic components, for example, a diode, a transistor such as a metal oxide semiconductor field effect transistor (MOSFET), a bipolar transistor, etc., operational amplifiers, an optoelectronic device, directional coupler, etc., and electronic switches. These electronic components are utilized in combination to reduce the inductive or electromagnetic field emanating from the wireless power transmitter 100a thereby reducing the wireless power received by wireless power receiver 100b. They may also be used to create a mismatch between the output impedance of the antenna (marked as receiver coil 108 in FIG. 1) and the input impedance of the rectifier thereby reducing the power transfer into the rectifier 109 in FIG. 1.

The rectifier 109 converts alternating current (AC) power to unregulated Direct Current (DC) power that is delivered to downstream circuitry such as a voltage regulator, battery charger, resistive/reactive load, portable system, that is indicated as 110 in FIG. 1. The rectifier 109 can be implemented in different configurations such as half-wave, full-wave, voltage doubler. A capacitor 112 in FIG. 1 is typically used at the output of the rectifier 109 to filter out the voltage "Vrect" ripple in the rectification conversion process. In the second embodiment, when the surge in wireless power exceeds the safe threshold, the wireless power receiver 100b adjusts its rectifier 109 configuration to reduce the amount of power delivered to the load. For example, the wireless power receiver 100b may employ a rectifier in bridge configuration. During an unsafe power surge, the wireless power receiver 100b may momentarily short the lower legs of the bridge rectifier to effectively circulate the current back to the receiver coil 108. The lower legs may remain shorted until the rectifier output voltage "Vrect" recovers to safe levels. Such an action protects the circuitry downstream of the rectifier 109 from the ill effects of the power surge. In the third embodiment, when the surge in wireless power exceeds the safe threshold, the wireless power receiver 100b sends "unsafe power level" messages or equivalent symbols to the wireless power transmitter 100a. These messages/symbols will cause the wireless power transmitter 100a to reduce its power output thereby reducing the amount of power received by wireless power receiver 100b. In the fourth embodiment, when the surge in wireless power exceeds the safe threshold, the wireless power receiver 100b increases the amount of filtering capacitance 112 to help protect downstream circuitry 110.

In the wireless power system disclosed herein, the wireless power transmitter 100a senses the removal of one or more wireless power receivers 100b from the charging zone. It then constrains its power output as required to ensure that the wireless power receivers 100b which are still in the charging zone are not exposed to unsafe power levels. The wireless power transmitter 100a can sense the removal of a wireless power receiver 100b by tracking the input power that it draws from source 101a in conjunction with messages that it receives from the wireless power receivers 100b.

Insertion of a second wireless power receiver 100b while power is being delivered from wireless power transmitter 100a to first wireless power receiver 100b, may expose the second newly inserted wireless power receiver 100b to unsafe power levels. For example, if a 5 W wireless power receiver 100b were placed in the charging zone of wireless power transmitter 100a that is currently delivering 50 W to a previously placed wireless power receiver 100b, the newly placed 5 W wireless power receiver 100b will likely be exposed to unsafe power levels. This scenario is referred to as "Hot Insertion". Alternately, if the first wireless power receiver 100b is removed from the charging zone and a second wireless power receiver 100b is placed rapidly into the charging zone before the wireless power transmitter 100a had sensed the removal of the first wireless power receiver 100b, then the second wireless power receiver 100b may be exposed to unsafe power levels. For example, consider a scenario where a wireless power transmitter 100a is delivering 30 W of power to wireless power receiver "X". Wireless power receiver "X" is removed and rapidly replaced by wireless power receiver "Y" which only requires 7.5 W of power. If the wireless power transmitter has not sensed the swap, it will continue to provide a very high level of power thereby exposing wireless power receiver "Y" to an unsafe level of power. This scenario is referred to as "Hot Swap".

In the wireless power system disclosed herein, the newly inserted wireless power receiver 100b and the wireless power transmitter 100a into which the wireless power receiver 100b is inserted into, both work together to protect the newly inserted wireless power receiver 100b from damage due to exposure to unsafe wireless power levels. On powering up with the power available in the charging zone, the wireless power receiver 100b sends special "new arrival" messages to the wireless power transmitter 100a. In an embodiment, on powering up with the power available in the charging zone, the wireless power receiver 100b sends preamble symbols or other preamble like messages. The wireless power transmitter 100a may have already recognized the insertion of a new wireless power receiver 100b through other mechanisms and algorithms and the "new arrival" message or "preamble" symbols may provide the wireless power transmitter with further confirmation of the event. Alternately, the receipt of the "new arrival" message or "preamble" symbols may be the main mechanism via which the wireless power transmitter 100a recognizes the insertion of a new wireless power receiver 100b. When the insertion of a new wireless power receiver 100b is recognized, the wireless power transmitter 100a immediately throttles back its power output to a safe level thereby protecting the newly inserted wireless power receiver 100b. Such a coordinated exchange and response counters the Hot-Swap scenario well. With regard to Hot-Insertion scenario, such a scale back in power output from the wireless power transmitter 100a will likely cause the previously inserted wireless power receivers 100b to send messages asking for more power. Based on these messages, the wireless power transmitter 100a increases the power output back up but does so gradually ensuring that the newly inserted wireless power receiver 100b has had sufficient time to adjust its internal circuitry to compensate and protect itself from the higher power levels. In a second embodiment, when the insertion of a new wireless power receiver 100b is recognized, the wireless power transmitter 100a reduces the power output to a fraction of the power level that was, like for example 50%, prior to the recognition. As a result, the existing previously placed wireless power receivers 100b are not excessively starved and the exposure to the newly placed wireless power receiver is reduced in half. In a third embodiment, when the insertion of a new wireless power receiver 100b is recognized, the wireless power transmitter 100a does not reduce its power output and waits for further messages from wireless power receiver 100b to decide on appropriate action. If messages to throttle back the power are received, then the wireless power transmitter 100a would reduce its power output rapidly while if messages to increase the power are received, then the wireless power transmitter 100a will increase its power output appropriately, As a result, the existing previously inserted wireless power receivers 100b continue to be fully served. The newly inserted wireless power receiver 100b may be over-exposed or under-exposed based on the power actually received so based on the messages from it to the wireless power transmitter 100a, the wireless power transmitter 100a effectively responds without making any assumptions.

The foregoing examples have been provided merely for the purpose of explanation and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials, and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention in its aspects.

I claim:

1. A wireless power system comprising:
    a wireless power transmitter operatively connected to an input power source, the wireless power transmitter configured to deliver power from the input power source wirelessly to one or more wireless power receivers that are placed within a charging zone of the wireless power transmitter, wherein when a wireless power receivers is placed within the wireless power transmitter's charging zone, the wireless power receiver is configured to receive power wirelessly to deliver the received power to its load;

wherein when a new wireless power receiver is placed into the wireless power transmitter's charging zone while the wireless power transmitter is already outputting wireless power, the wireless power transmitter senses the new wireless power receiver and constrains its wireless power output to ensure that new wireless power receiver is minimally exposed to unsafe power levels.

2. The wireless power system of claim 1, wherein said wireless power transmitter senses the insertion of new said wireless power receiver into its said charging zone via one or more of "new arrival" messages, preamble symbols and preamble like messages from said inserted wireless power receiver.

3. The wireless power system of claim 1, wherein on recognition of newly inserted said wireless power receiver in its said charging zone, said wireless power transmitter throttles back its power output to a safe low level.

4. The wireless power system of claim 1, wherein on recognition of newly inserted said wireless power receiver in its said charging zone, said wireless power transmitter throttles back its power output to a fraction of what it was prior to the said recognition.

5. The wireless power system of claim 3, wherein said wireless power transmitter following throttling back its power output to a safe low level, said wireless power transmitter increasing the power output back up gradually ensuring that said inserted wireless power receiver has had sufficient time to adjust its internal circuitry to compensate and protect itself under higher power levels.

6. The wireless power system of claim 4, wherein said wireless power transmitter following throttling back its power output its power output to a fraction of what it was prior, said wireless power transmitter increasing the power output back up gradually ensuring that said inserted wireless power receiver has had sufficient time to adjust its internal circuitry to compensate and protect itself under higher power levels.

7. A wireless power system comprising:
a wireless power transmitter operatively connected to an input power source, the wireless power transmitter configured to deliver power from the input power source wirelessly to one or more wireless power receivers that are placed within a charging zone of the wireless power transmitter, wherein when a wireless power receiver is placed within the wireless power transmitter's charging zone, the wireless power receiver is configured to receive power wirelessly to deliver the received power to its load;

wherein when one of the wireless power receivers currently in the charging zone and receiving power wirelessly is removed from the charging zone of the wireless power transmitter, the wireless power transmitter senses the removal of the wireless power receiver and constrains its power output to ensure that the wireless power receivers that still remain in the charging zone are minimally exposed to unsafe power levels.

8. The wireless power system of claim 7, wherein said wireless power transmitter senses the removal of said wireless power receiver from its said charging zone by tracking the input power that said wireless power transmitter draws from its said input power source in conjunction with messages that it receives from said wireless power receivers that remain in the said charging zone.

9. A wireless power system comprising:
a wireless power transmitter operatively connected to an input power source, the wireless power transmitter configured to deliver power from the input power source wirelessly to one or more wireless power receivers that are placed within a charging zone of the wireless power transmitter, wherein when a wireless power receiver is placed within the wireless power transmitter's charging zone, the wireless power receiver is configured to receive power wirelessly to deliver the received power to its load;

wherein while receiving power wirelessly if the wireless power receiver detects a surge of received power exceeding safety thresholds, the wireless power receiver performs one or more of:
adjusting its impedance network to reduce the amount of power delivered to rectifier of the wireless power receiver,
adjusting the rectifier configuration to reduce the amount of power delivered to the load,
increasing the amount of filtering capacitance at the output of the rectifier,
to ensure that its internal circuitry is protected from damage without specific assistance from the wireless power transmitter.

* * * * *